US012649581B2

(12) United States Patent
Obrist

(10) Patent No.: US 12,649,581 B2
(45) Date of Patent: Jun. 9, 2026

(54) AIRCRAFT

(71) Applicant: OBRIST TECHNOLOGIES GMBH,
Lustenau (AT)

(72) Inventor: Frank Obrist, Bregenz (AT)

(73) Assignee: OBRIST TECHNOLOGIES GMBH,
Lustenau (AT)

( * ) Notice: Subject to any disclaimer, the term of this
patent is extended or adjusted under 35
U.S.C. 154(b) by 0 days.

(21) Appl. No.: 18/029,859

(22) PCT Filed: Sep. 29, 2021

(86) PCT No.: PCT/EP2021/076785
§ 371 (c)(1),
(2) Date: Mar. 31, 2023

(87) PCT Pub. No.: WO2022/069540
PCT Pub. Date: Apr. 7, 2022

(65) Prior Publication Data
US 2024/0017846 A1 Jan. 18, 2024

(30) Foreign Application Priority Data

Oct. 2, 2020 (DE) ........................ 10 2020 125 799

(51) Int. Cl.
*B64D 27/04* (2006.01)
*B60L 50/60* (2019.01)
(Continued)

(52) U.S. Cl.
CPC .............. *B64D 27/04* (2013.01); *B60L 50/60*
(2019.02); *B64C 25/405* (2013.01); *B64D*
*27/33* (2024.01);
(Continued)

(58) Field of Classification Search
CPC ...... B64D 35/02; B64D 35/022; B64D 27/04;
B64D 27/24; B60L 50/60; B60L 50/61;
(Continued)

(56) References Cited

U.S. PATENT DOCUMENTS 11,117,660 B2 * 9/2021 Fredericks .......... B64C 29/0033
11,603,202 B2 * 3/2023 Fredericks .......... B64C 29/0033
(Continued)

FOREIGN PATENT DOCUMENTS

CN 102971216 A 3/2013
CN 106081072 A 11/2016
(Continued)

OTHER PUBLICATIONS

German Patent Application No. 10 2020 125 799.6, Search Report,
mailed Sep. 15, 2021, 7 pages.
(Continued)

*Primary Examiner* — Benjamin P Lee
(74) *Attorney, Agent, or Firm* — Cesari and McKenna,
LLP

(57) ABSTRACT
The invention relates to an aircraft comprising a drive
system having a power unit, at least one drive battery, and
at least one electric motor drawing electrical energy from the
at least one drive battery, wherein the power unit comprises
a two-cylinder reciprocating-piston engine having two cyl-
inder-piston units in tandem arrangement and comprises at
least one generator for generating electrical energy, wherein
each cylinder-piston unit has a crankshaft, and wherein the
crankshafts are mechanically coupled to each other, and
wherein at least one crankshaft is mechanically connected to
the at least one generator. The invention also relates to
additional improvements of the aircraft and to an operating
method.

17 Claims, 4 Drawing Sheets

(51) Int. Cl.

| | |
|---|---|
| *B64C 25/32* | (2006.01) |
| *B64D 27/33* | (2024.01) |
| *B64D 27/357* | (2024.01) |
| *B64D 35/00* | (2006.01) |
| *H01M 50/209* | (2021.01) |
| *H01M 50/249* | (2021.01) |
| *B64C 27/02* | (2006.01) |
| *B64D 27/02* | (2006.01) |

(52) U.S. Cl.
CPC ........... *B64D 27/357* (2024.01); *B64D 35/00* (2013.01); *H01M 50/209* (2021.01); *H01M 50/249* (2021.01); *B60L 2200/10* (2013.01); *B64C 27/02* (2013.01); *B64D 27/026* (2024.01); *H01M 2220/20* (2013.01)

(58) Field of Classification Search
CPC ............. B60L 2200/10; H01M 50/249; H01M 2220/20; B64C 25/405
See application file for complete search history.

(56) References Cited

U.S. PATENT DOCUMENTS

| | | | | |
|---|---|---|---|---|
| 11,738,875 | B2 * | 8/2023 | Ricci ..................... | B60L 3/0092 244/53 R |
| 2003/0094537 | A1 * | 5/2003 | Austen-Brown ... | B64C 29/0033 244/7 R |
| 2013/0147204 | A1 * | 6/2013 | Botti .................... | B64D 27/357 903/903 |
| 2018/0346136 | A1 * | 12/2018 | Arkus ................. | B64D 35/023 |
| 2018/0354613 | A1 | 12/2018 | Cvrlje | |
| 2019/0084684 | A1 * | 3/2019 | Eller ................. | B64C 29/0025 |
| 2019/0118943 | A1 * | 4/2019 | Machin .................. | B64C 29/02 |
| 2019/0322360 | A1 | 10/2019 | Dubacher et al. | |
| 2019/0344883 | A1 | 11/2019 | Brezina | |

| | | | | |
|---|---|---|---|---|
| 2020/0044214 | A1 * | 2/2020 | Obrist ................. | H01M 10/613 |
| 2020/0102068 | A1 * | 4/2020 | Mombrinie .......... | B64C 25/405 |
| 2020/0263602 | A1 * | 8/2020 | Knob ...................... | F16F 15/24 |
| 2020/0324894 | A1 * | 10/2020 | Fredericks .......... | B64C 29/0033 |
| 2021/0016880 | A1 * | 1/2021 | Ishikawa .............. | F02B 75/282 |
| 2022/0048617 | A1 * | 2/2022 | Shima ....................... | B64C 5/02 |
| 2022/0106050 | A1 * | 4/2022 | Resnick ................. | B64D 27/40 |
| 2022/0185490 | A1 * | 6/2022 | Ricci ..................... | B64D 31/06 |
| 2023/0042223 | A1 * | 2/2023 | Ishikawa ............... | B64D 27/24 |

FOREIGN PATENT DOCUMENTS

| | | | | | | |
|---|---|---|---|---|---|---|
| CN | 108313263 | A | * | 7/2018 | | |
| CN | 109018335 | A | | 12/2018 | | |
| CN | 110137630 | A | * | 8/2019 | ............. | B60L 50/64 |
| DE | 102008014404 | A1 | | 10/2009 | | |
| DE | 102010021026 | A1 | | 11/2011 | | |
| DE | 102011103572 | A1 | | 12/2011 | | |
| DE | 202015005887 | U1 | | 10/2015 | | |
| DE | 202017106992 | U1 | | 11/2017 | | |
| DE | 102017106068 | A1 | | 9/2018 | | |
| DE | 102018125874 | A1 | | 4/2020 | | |
| EP | 000000617846 | B1 | | 7/1996 | | |
| WO | WO-2018172157 | A1 | * | 9/2018 | ............. | B64D 27/24 |
| WO | 2019065848 | A1 | | 4/2019 | | |
| WO | WO-2020049249 | A1 | * | 3/2020 | ......... | H01M 10/425 |

OTHER PUBLICATIONS

PCT Notification of Transmittal of the International Search Report and the Written Opinion of the International Searching Authority, or the Declaration, International Searching Authority, International Application No. PCT/EP2021/076785, mailed Jan. 14, 2022, 18 pages.

Friedrich, C., and P. A. Robertson. "Hybrid-electric propulsion for automotive and aviation applications." CEAS Aeronautical Journal 6.2 (2015): 279-290.

* cited by examiner

AIRCRAFT

CROSS REFERENCE TO RELATED APPLICATIONS

This application is the National Stage of International Application No. PCT/EP2021/076785, filed Sep. 29, 2021, which claims the benefit of German Patent Application 102020125799.6 filed on Oct. 2, 2020. The contents of both applications are hereby incorporated by reference in their entirety.

TECHNICAL FIELD

The invention relates to an aircraft and a method for operating such an aircraft.

BACKGROUND

Aircraft are known from practice which have a main rotor for generating lift and at least one drive propeller for generating propulsion. Such aircraft use in particular the principle of autorotation for the main rotor, so that with sufficient propulsion, which is provided by the drive propeller, the main rotor rotates automatically or respectively without artificial energy supply and thus keeps the aircraft in the air. Such aircraft enable a flying locomotion with relatively little energy expenditure.

The current development with regard to the discussion concerning climate-friendly mobility and the technical further development of purely electric drive systems have also produced, in the meantime, prototypes of small aircraft which are operated purely electrically. Often in such aircraft several main rotors are arranged around a passenger compartment, which keep the aircraft in a stable attitude through corresponding controlling. The aircraft are climate-friendly as they can be operated in an emission-free manner. Disadvantages of these solutions are, however, the small range, as the battery technology available in the short and medium term only has low power densities, and the high space requirement on the ground.

SUMMARY

Against this background, the invention is based on the problem of indicating an aircraft which can be operated in a climate-friendly manner and which nevertheless has a high range. Furthermore, it is an object of the invention to indicate an operating method for such an aircraft.

This problem is solved according to the invention by the subjects of claims 1 and 14.

The invention is thus based on the idea of indicating an aircraft having a drive system, wherein the drive system comprises a power unit, at least one drive battery and at least one electric motor, which draws electrical energy from the drive battery, wherein the power unit comprises a two-cylinder reciprocating-piston engine having two cylinder-piston units in tandem arrangement and comprises at least one generator for generating electrical energy, wherein each cylinder-piston unit has a crankshaft, and the crankshafts of the two cylinder-piston units are mechanically coupled to each other, and wherein at least one crankshaft, in particularly both crankshafts each, is mechanically connected to the at least one generator.

The aircraft according to the invention is based on the basic idea of increasing the range of an electrically operated aircraft by a combustion engine, namely the two-cylinder reciprocating-piston engine. The two-cylinder reciprocating-piston engine serves here only for generating electrical energy, so that the actual drive power for the aircraft takes place purely electrically. In order to be operated in as failsafe a manner as possible, several electric motors can be provided in the invention, wherein each electric motor is connected to its own drive battery or in parallel connection to all available drive batteries.

If each electric motor is connected in parallel connection to all drive batteries or at least two drive batteries, each of the electric motors can also continue to be operated in the event of failure of one drive battery. If each drive battery is connected to each electric motor in parallel connection, the electrical energy stored in the respective drive battery can also be further utilized if an electric motor fails. The parallel connection of drive batteries and electric motors forms in this respect a redundancy which configures the flight operation in a particularly secure manner.

In order to further increase the fail-safety, provision is preferably made that the two-cylinder reciprocating-piston engine has two generators, wherein a first generator is electrically connected to the first drive battery and a second generator is electrically connected to the second drive battery.

Two drive trains which are independent from one another are thus produced, which are only connected to one another by the combustion engine. Provision is made here that the capacity of the drive batteries is sufficient in order to at least land the aircraft safely if the two-cylinder reciprocating-piston engine fails. If, on the other hand, another component of the drive train fails, for example one of the generators or one of the electric motors or one of the drive batteries, the power of the second drive train is retained entirely.

Alternatively, both generators can also be connected in parallel connection to both or respectively all drive batteries, so that in the event of failure of a generator, all drive batteries can continue to be supplied with electrical energy.

In this way, a longer flight duration can be achieved in the event of failure of a drive battery and/or of an electric motor. Thus, in the event of failure of a drive battery, the other drive battery can be recharged with a higher electrical power, so that as a whole the flight duration is increased up to an emergency landing and the possibility of a safe landing always exists. This can indeed be to the detriment of the lifespan of the drive battery; however, the safety aspect of a safe landing is at the forefront.

It is also possible that the generators are additionally connected or able to be connected respectively to the electric motors via a bypass circuit, so that in the event of failure of one drive battery or several drive batteries, the electrical energy generated in the generators can be directed to the electric motors directly.

The drive system is preferably an, in particular exclusively, serial hybrid drive system. In other words, the two-cylinder reciprocating-piston engine is connected in series to the drive batteries and to the electric motors. The two-cylinder reciprocating-piston engine therefore does not drive the aircraft directly, but rather only provides energy for the generation of electrical energy, which is then retrieved via the drive batteries as buffer storage by the electric motors and converted into kinetic energy of the aircraft. This has the advantage that the two-cylinder reciprocating-piston engine can be operated in an optimum speed range with small load changes, preferably with a fuel-air ratio of 1=1. The two-cylinder reciprocating-piston engine can thus be operated in a particularly clean or respectively low-emission manner, whereby in particular a costly exhaust gas after treatment is reduced or even unnecessary. This reduces the weight of the two-cylinder reciprocating-piston engine and the production costs, which can be critical for the realization of such an aircraft. At the same time, through the clean combustion, the emission of pollutants, in particular nitrogen oxides, is kept low.

A further advantage of the serial hybrid drive system consists in that through the two-cylinder reciprocating-piston engine the drive batteries can be designed to be smaller than is necessary in the case of aircraft which are operated purely electrically. The weight of the aircraft can thereby be significantly reduced. This, in turn, reduces the energy requirement for the flight and considerably increases the range of such an aircraft.

For the realization of a serial hybrid drive system it is particularly preferred if the two-cylinder reciprocating-piston engine exclusively drives the at least one generator. When the aircraft is equipped with a two-cylinder reciprocating-piston engine which has two generators, which is particularly preferred, the two-cylinder reciprocating-piston engine can thus drive the two generators exclusively. In other words, the two-cylinder reciprocating-piston engine exclusively drives generators or a generator, but does not directly bring about a motion of the aircraft.

The two-cylinder reciprocating-piston engine with tandem arrangement is particularly compact in construction and can be operated in a very low-vibration manner. A low-vibration drive is of great importance in the light and partially projecting structures of aircraft. In addition, the weight of the two-cylinder reciprocating-piston engine is particularly low and the efficiency is high.

According to the invention, the two cylinder-piston units have respectively a crankshaft, and the crankshafts of both cylinder-piston units are mechanically coupled to each other. For example, the crankshafts can have toothed spur gears which engage into one another. In this respect, provision is made particularly preferably that the spur gears rotate in opposite directions. The cylinder-piston units can have respectively cylinder axes which have a distance from one another which is smaller than the distance of the centre axes of the crankshafts. This inwardly engaged interconnection of the cylinder-piston units provides for a particularly smooth running, in particular at the start of the two-cylinder reciprocating-piston engine.

At least one of the crankshafts is mechanically connected to a generator. This applies to a two-cylinder reciprocating-piston engine which has a single generator. In the case of a two-cylinder reciprocating-piston engine which has two generators, provision is preferably made if each of the crankshafts is mechanically connected to a generator respectively.

In order to configure the two-cylinder reciprocating-piston engine in a particularly compact manner, provision can preferably be made that the two-cylinder reciprocating-piston engine has a bottom camshaft. Alternatively, two overhead camshafts can also be provided, so that the valves of the individual cylinder-piston units are able to be controlled independently of one another.

Generally, in a preferred variant of the invention provision can be made that the two-cylinder reciprocating-piston engine has a control which is configured so that one cylinder-piston unit can continue to be operated in the event of a failure of the other cylinder-piston unit. Thus, for example, a first cylinder-piston unit can continue to perform work if for example the valve control is defective in the second cylinder-piston unit. This contributes crucially to the fail-safety of the aircraft.

The control can furthermore control the operation of the two-cylinder reciprocating-piston engine such that the two-cylinder reciprocating-piston engine is switched on when the drive battery or one of the drive batteries has a state of charge of less than 80%, in particular less than 70%, in particular less than 60%, in particular less than 50%, and/or the aircraft has reached a predetermined minimum flight altitude. In particular, the control of the two-cylinder reciprocating-piston engine can be adapted so that the state of charge (SOC) of the drive battery/batteries is kept substantially in a range between 50% and 80%. This conserves the drive batteries and maintains their overall capacity for a particularly long period. In addition, by taking into consideration the flight altitude, the noise emissions close to the ground can be reduced, as in this region flying is to be carried out purely electrically.

In order to minimize noises and vibrations, the two-cylinder reciprocating-piston engine can be arranged, in addition, in an enclosed housing. The housing can be installed in the aircraft in a spring-mounted, in particular rubber-mounted manner. The two-cylinder reciprocating-piston engine forms a power unit with the at least one generator, in particular with the two generators. Preferably, each generator of the power unit has an electrical output power of at least 40 kW, preferably at least 50 kW, preferably at least 60 kW. The electric motor can have an electrical power consumption of 50 kW. Several electric motors can be provided, which can have identical or different power consumptions. The power consumptions can vary between 20 kW and 100 kW.

In a further preferred embodiment of the invention, provision is made that the drive system has at least one fuel tank, in particular for a fuel based on methanol. The operation of the drive system with methanol as fuel is particularly preferred, as thereby the overall emissions of the vehicle can be considerably reduced. Methanol is a fuel which is very simple to produce and synthesizing fuel on the basis of hydrocarbon and alcohol. In particular, the $CO_2$ balance can be equalized for the operation of the aircraft, when the methanol is produced by regenerative energy. In this way, a particularly climate-friendly operation of the aircraft is possible.

The at least one drive battery can have a housing, sealed in a gas-tight manner, and a cell block, which is formed from several battery cells connected electrically and mechanically by contact plates. The housing can be connectable or connected to a vacuum pump to generate a vacuum within the housing. Preferably a vacuum prevails within the housing. Provision can be made here that at least one housing side wall of the housing is so flexible that the housing side wall is tensioned by the vacuum acting within the housing with the cell block. In other words, owing to the vacuum prevailing within the housing, the housing side wall can bulge inwards so that a firm contact exists between the housing side wall and the cell block.

The tensioning between the housing and the cell block of the drive battery is preferably brought about by a vacuum which acts permanently within the housing. The housing can thus be formed with a relatively small wall thickness and is nevertheless sufficiently stable. At the same time, through the smaller wall thickness of the housing, the weight of the drive battery is reduced. The tensioning of the housing with the cell block makes provision furthermore that a good heat transfer is achieved from the cell block to the housing. This improves the cooling of the battery cells and thus increases the performance and lifespan of the drive battery.

Generally it is advantageous in particular with regard to the use of the drive battery in the aircraft if the drive battery has as high an energy content as possible with as small a mass as possible and/or as small a volume as possible. In particular, the mass of components of the drive battery, which have no energy storage function, should therefore be largely reduced. The ratio of the mass of energy-storing components, i.e. the sum of the mass of all battery cells of the drive battery, to the mass of the entire drive battery should consequently be as great as possible. In particular, it is advantageous if the ratio between the sum of the mass of the battery cells and the mass of the entire drive battery (including inter alia the housing) is at least 0.85, in particular between 0.85 and 0.95, in particular between 0.9 and 0.95. In other words, the mass of all battery cells within the drive battery takes up at least 85%, in particular between 85% and 95%, in particular between 90% and 95%, of the total mass of the drive battery.

A pressure sensor can be arranged within the housing for controlling the vacuum pump, wherein the pressure sensor is connected to a control unit, which is adapted so that a control signal is emitted when the measured value of the pressure sensor lies outside a predetermined safety range.

Through the pressure sensor, optionally arranged within the housing, for controlling the vacuum pump, it is advantageously possible to control the vacuum within the housing. In particular, the vacuum pump can be activated periodically, when the vacuum within the housing falls below a predetermined threshold value. In this way, a safety monitoring can be implemented. In particular, the pressure sensor can be connected to a control unit, which is adapted so that a control signal is emitted, when the measured value of the pressure sensor lies outside a predetermined safety range.

Furthermore, as part of the safety monitoring, a chronological monitoring of a pressure loss can take place. When the vacuum within the housing does not reach the target value within a predetermined time window, or the chronological intervals between necessary activations of the vacuum pump become smaller, various measures can be initiated by means of the control unit, for example the emitting of an alarm signal and/or the switching off of the drive battery or its disconnecting from the further drive system.

Basically, the aircraft can be a rotary-wing aircraft or a fixed-wing aircraft. The presented concept can be applied to all kinds of aircraft.

In any case, provision is preferably made that the aircraft has at least one drive propeller, wherein the electric motor drives the drive propeller and draws electrical energy from the at least one drive battery.

In addition, the aircraft can have at least one main rotor. The main rotor can have adjustable rotor blades. It is possible that the main rotor is not actively driven, but rather is set in rotation automatically by a propulsion of the aircraft (autorotation). Alternatively, the drive system can comprise a further electric motor, which draws electrical energy from the at least one drive battery and drives the main rotor at least intermittently.

In particular, the aircraft can be a gyrocopter, i.e. a rotary-wing aircraft with a main rotor, wherein the main rotor on the one hand is partially set in rotation by autorotation and on the other hand is intermittently driven actively by the electric motor. The main rotor can therefore be operable basically according to the principle of autorotation. Furthermore, the drive system can have a coupling which is arranged between the main rotor and an electric motor of the main rotor so that the main rotor is able to be mechanically coupled to the electric motor. The electric motor can thus actively drive the main rotor. When, on the other hand, the coupling is released and thus no mechanical connection exists between the electric motor and the main rotor, the drive of the main rotor takes place passively by autorotation as a result of the propulsion of the aircraft.

In particular it can be achieved in the above-mentioned manner that the aircraft gains height by means of the driven main rotor firstly in the start phase. As soon as sufficient propulsion was achieved with the at least one drive propeller, therefore a sufficient cruising speed exists, the electric motor of the main rotor can be uncoupled and switched off, so that the main rotor, owing to the propulsion by the drive propeller, passes into autorotation. The aircraft can thus be kept in the air in a stable manner solely by the drive propeller and the corresponding setting of the forward speed. An additional energy supply for the main rotor is not necessary, whereby the energy requirement of the aircraft is reduced.

It is particularly preferred if the aircraft has two drive propellers, the rotation axes of which are arranged parallel to one another. The drive propellers are preferably configured so that they rotate in opposite directions and thus compensate a torque acting from the main rotor onto the passenger compartment. This provides for a stable flight. The drive system can be designed as a whole as a 48 Volt system. It is also possible to design the drive system as a 400 Volt- or 800 Volt system. In 400 Volt- or 800 Volt systems in addition a fast charging function can be integrated, so that the drive batteries can be charged via a fast charging station with a high direct current. In all cases, provision is preferably made if the aircraft can be supplied with electrical current externally, in order to charge the drive batteries quickly.

The electric motor for the main rotor can have a power consumption of 20 kW. As the propulsion in cruising flight takes place by the drive propeller(s), and this keeps the main rotor, uncoupled from the electric motor, in autorotation, an electric motor with relatively small power is sufficient for the start phase. The drive propeller, on the other hand, preferably has a power consumption of 50 kW.

A further aspect of the invention concerns a method for operating an aircraft, in particular a previously described aircraft, wherein the at least one main rotor and the at least one drive propeller are driven by respectively an electric motor, wherein each electric motor draws electrical energy from respectively a drive battery associated with the respective electric motor, and wherein each drive battery is supplied by an electric generator. The generators are operated here by a shared combustion engine, which is fed with a fuel based on methanol. The previously explained operating method enables a particularly climate-friendly operation of the aircraft, in particular when the methanol is produced by the use of regenerative energies, for example regeneratively obtained current.

A further problem of the invention consists in indicating an aircraft which can be operated in a particularly energy-efficient manner on the ground. This problem is solved by the subject of claim 10.

In practice, the problem is solved by an aircraft, in particular a previously described aircraft, which has a ground handling gear, wherein the ground handling gear has at least one wheel, in particular a nose wheel or a rear wheel. The rear wheel can also be embodied as a tail wheel. According to the invention, the wheel is electrically driven.

In conventional aircraft, in particular aeroplanes, the drive of the aircraft on the ground takes place mostly by the engines or the drive propeller or a drive system which also moves the aircraft in the air. In turbine-operated or motor-operated aircraft, it is expedient that the drive components are preheated by the operation on the ground, as these are highly stressed at the start. In the case of an electrically operated aircraft, as is preferably used in the invention, a preheating of the drive systems is not necessary. In this respect, the drive can be configured in a more energy-efficient manner on the ground. The invention utilizes this and proposes an electromotively operated wheel as drive wheel for the ground motion of the aircraft. The electrically driven wheel acts directly on the ground or respectively the runway and thus transfers the kinetic energy in a particularly efficient manner. The electrically driven wheel can rotate clockwise or anticlockwise, so that a driving operation in reverse is also possible.

In a preferred variant, the wheel can comprise in addition an electric steering drive to change the direction of travel of the aircraft. The electric steering drive can be, for example, an electric motor which rotates the wheel in the desired direction of travel.

Furthermore, in a further variant of the invention, provision can be made that the ground handling gear has two wheels which are arranged spaced apart from one another and coaxially to one another. Such wheels are often arranged as rear wheels under aerofoils or the fuselage of an aircraft. Preferably, each of the two wheels is driven by an electric motor. The electric motors are, in turn, connected to a control which is preferably configured so that through different actuation of the electric motors a change in direction of travel of the aircraft is brought about. In other words, the two wheels can be rigid, therefore not steerable themselves. Through the different actuation of the two wheels, a cornering of the aircraft can nevertheless be enabled, however. For example, the aircraft can have a nose wheel which is rotatable. The two rear wheels are respectively driven by electric motors, wherein the electric motors are controlled so that through different wheel speeds at the rear wheels, the nose wheel is turned in a predetermined direction. Thus, likewise, a movement of the aircraft can be influenced on the ground.

A further problem of the invention consists in indicating an aircraft which enables a particularly energy-efficient and, in addition, quiet flight operation. This problem is solved by the subject of claim 13.

The invention is thus based on the idea of indicating an aircraft, in particular a previously described aircraft, with at least one drive propeller, which is electrically driven and is arranged in a sound insulation casing.

In the utilization of aircraft in particular in the urban environment, it is necessary to generate as low noise emissions as possible. This applies in particular to the start- and landing phase of the aircraft. In this respect, provision is made in the invention that the aircraft has drive batteries which can store electrical energy sufficiently in order to carry out a start and a landing. In other words, the aircraft is to be operated purely battery-electrically in the start- and landing phase. The noise emissions are thereby already considerably reduced. However, the drive propeller generates a noise emission through eddy effects. In order to reduce these, provision is made in the invention that the drive propellers are respectively enclosed in a sound insulation casing. The noise emission is thus considerably reduced at least laterally to the aircraft. The drive propellers, respectively enclosed in a sound insulation casing, can be used in all aircraft which are described in this application.

Preferably, the sound insulation casing is integrated in aerofoils or respectively into the aerofoil design of the aircraft. The aerofoils of the aircraft can thus be configured for example so that sound waves originating from a drive propeller, which propagate in particular downwards and laterally, in practice in the direction of the ground, are deflected or respectively reflected upwards.

For all embodiments of aircraft in this application it applies that the aircraft is preferably configured as an aerial sports craft. The concept which is presented here, in particular the previously described operating method, can be applied to all kinds of aircraft.

BRIEF DESCRIPTION OF THE DRAWINGS

The invention is explained more closely in the following with the aid of an example embodiment with reference to the enclosed schematic drawings. There are shown therein FIG. 1 a front view onto an aircraft in accordance with the invention according to a preferred example embodiment.

DESCRIPTION

Figure 1:
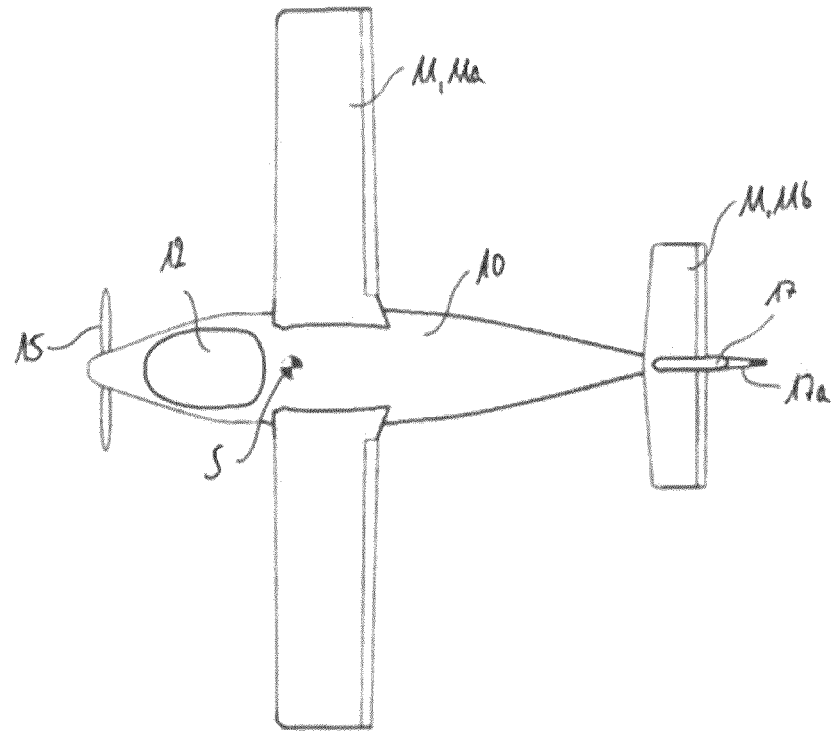

The aircraft according to the invention is designed in all example embodiments preferably as a small aircraft for a maximum of four, in particular a maximum of three, in particular a maximum of two persons. The aircraft can be created in lightweight construction. In particular, the aircraft can be configured and authorized as an aerial sports craft.

In general, the aircraft comprises a passenger compartment 10, which is connected to aerofoils 11. Here, front aerofoils 11a and rear aerofoils 11b are provided. The passenger compartment 10 comprises a cockpit 12.

Figure 2:
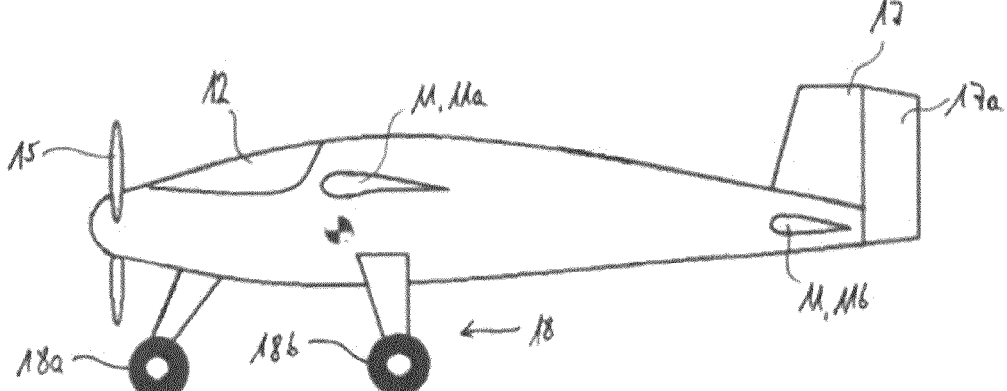
FIG. 2 a side view of the aircraft according to FIG. 1.

In the example embodiment according to FIGS. 1 and 2, the aircraft has a drive propeller 15 which is mounted directly on the passenger compartment 10. The drive propeller 15 is mounted in particular in front of the cockpit and forms substantially the tip of the aircraft. The shape of the aircraft according to FIGS. 1 and 2 corresponds substantially to the conventional shape of an aeroplane with the front aerofoils 11a as main aerofoils and the rear aerofoils 11b as parts of an empennage, in particular as horizontal stabilizer. Furthermore, a vertical stabiliser 17 with a rudder 17a is provided. The aircraft according to FIGS. 1 and 2 further comprises a landing gear 18, which comprises a nose wheel 18a and two rear wheels 18b. The nose wheel 18a is preferably rotatable, in order to be able to bring about a change of direction during the moving of the aircraft on the ground.

In FIGS. 1 and 2 furthermore a centre of gravity S is marked, which indicates the overall centre of gravity of the aircraft in unloaded state. The power unit 20 and the drive battery are preferably arranged behind the centre of gravity S, preferably at the level of the rear wheels 18b. In this way, a particularly good overall centre of gravity of the aircraft is produced in flight, and on starting and landing.

The aircraft according to FIGS. 1 and 2 preferably has a power unit 20 with two generators 30. Each of the generators 30 is preferably electrically connected to one or more drive batteries. The one or more drive batteries are, in turn, electrically coupled to the drive propeller 15. A failsafe, hybrid-electric aircraft is thus provided.

Figure 3:
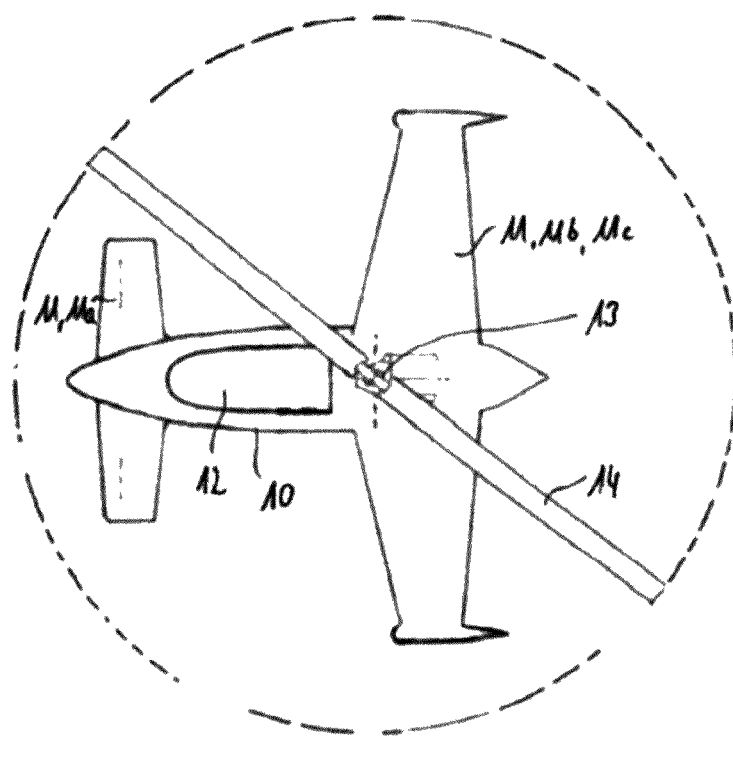
FIG. 3 a top view onto an aircraft in accordance with the invention according to a further preferred example embodiment.
Figure 4:
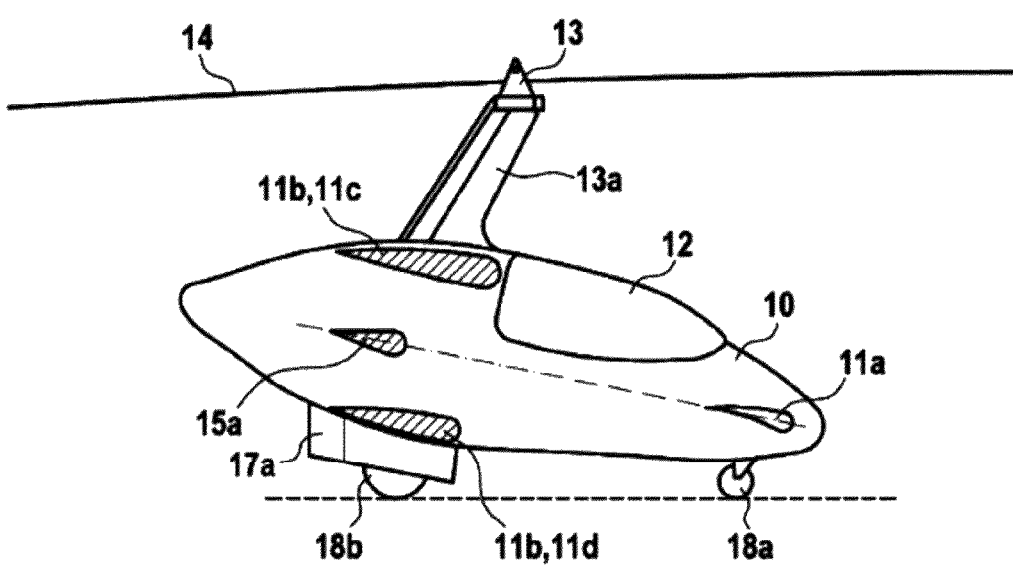
FIG. 4 a side view of the aircraft according to FIG. 3.
Figure 5:
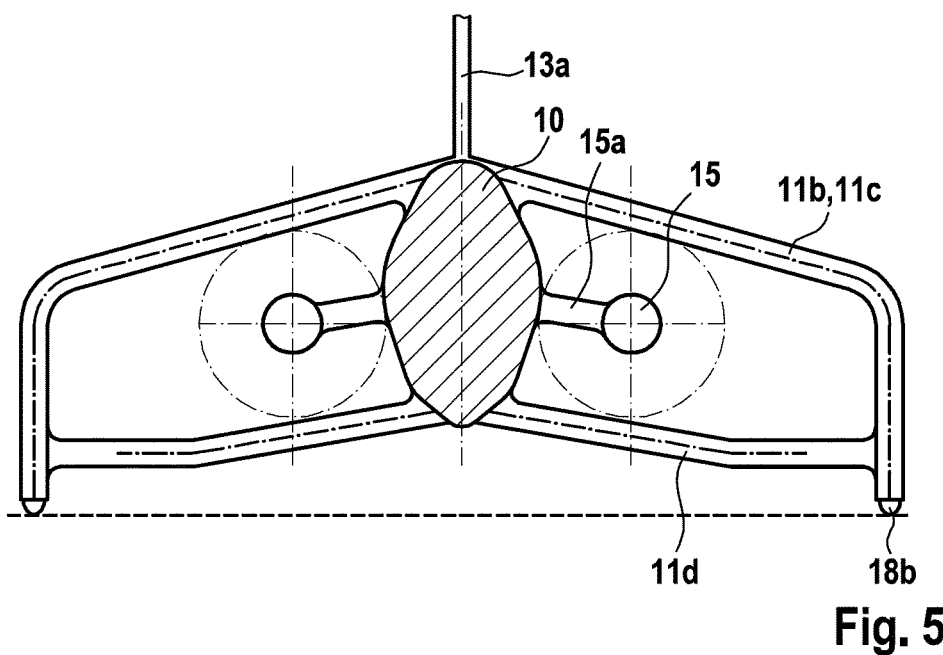
FIG. 5 a cross-sectional view of the aircraft according to FIG. 3.

In FIGS. 3 to 5 an aircraft is illustrated according to a further preferred example embodiment. This type of aircraft concerns substantially a combination autogyro and/or gyrocopter. The aircraft also comprises a passenger compartment 10 with a cockpit 12. Furthermore, aerofoils 11 are provided, which are securely arranged on the passenger compartment 10. In the case of the aircraft according to FIGS. 3 to 5, front aerofoils 11*a* form a horizontal stabilizer. Rear aerofoils 11*b* form substantially the main aerofoils. As can be seen in FIG. 5, two drive propellers 15 are also provided, which are mounted on nacelles 15*a*. The nacelles 15*a* are securely connected to the passenger compartment.

The aircraft according to FIGS. 3 to 5 comprises in addition a landing gear 18 with a rotatable nose wheel 18*a* and two rear wheels 18*b*. The nose wheel 18*a* and the rear wheels 18*b* can be retractable as a whole.

In contrast to the aircraft according to FIGS. 1 and 2, the aircraft according to FIGS. 3 to 5 has in addition a main rotor 13, which comprises two rotor blades 14. The rotor blades 14 are adjustable, so that their angle of attack can be adapted. The main rotor 13 is securely connected to the passenger compartment 10 via a rotor boom 13*a*.

The main rotor 13 and the drive propellers 15 are respectively driven by electric motors. Preferably, a coupling, preferably with a freewheel, is provided between the electric motor of the main rotor 13 and the main rotor 13 itself, so that the main rotor 13 is able to be uncoupled entirely from the electric motor. Alternatively, the electric motor can be configured as a brushless motor, so that a complete mechanical uncoupling of the main rotor 13 can be achieved by shutting off the electric motor.

In operation, the main rotor can therefore be driven electromotively, in particular in order to enable a quick, almost vertical, start (so-called jump start). In actual air travel operation, the aircraft is preferably driven exclusively by the drive propellers 15. Through the propulsion, the main rotor 13 is automatically set into a rotation (autorotation). The electric motor of the main rotor 13 can thus be switched off. In this way, a particularly efficient flight operation is possible.

In the cross-sectional view according to FIG. 5 the structure of the rear aerofoil 11*b* can be readily seen. The rear aerofoil 11*b* forms substantially a frame which surrounds the drive propellers 15. In practice, the rear aerofoil 11*b* has an upper aerofoil 11*c* and a lower aerofoil 11*d*, wherein the upper aerofoil is respectively directed downwards at its ends and is connected to the lower aerofoil 11*d*. The rear wheels 18*b* are directly connected to the downwardly directed side parts of the upper aerofoil 11*c* or respectively are rotatably mounted in these side parts and are thereby faired aerodynamically in an optimum manner.

The frame-like casing of the drive propellers 15 by the rear aerofoil 11*b* distinctly reduces the noise emissions. The drive propellers 15 are thus enclosed substantially, whereby the sound occurring by the rotation of the drive propellers 15 is deflected, whereby the noise emissions can be reduced, in particular close to the ground. The rear aerofoil 11*b* forms in this respect a sound insulation casing for the drive propellers 15.

The laterally downwardly directed portions of the upper aerofoil 11*c* can form a vertical stabilizer 17 and preferably comprise respectively a rudder 17*a*.

Figure 6:
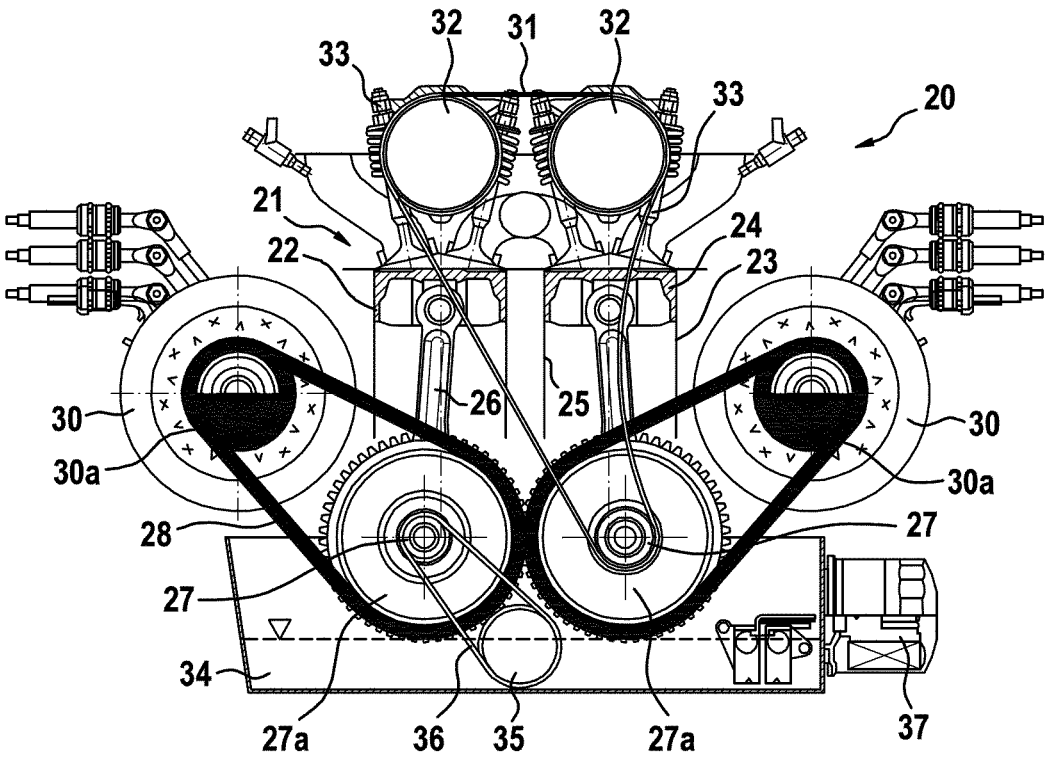
FIG. 6 a cross-sectional view of a power unit for an aircraft in accordance with the invention according to a preferred example embodiment and FIG. 7 a perspective view of a drive battery for an aircraft in accordance with the invention according to a preferred example embodiment.

In FIG. 6 a power unit 20 is shown for an aircraft according to the invention. The power unit 20 comprises a 2-cylinder reciprocating-piston engine 21 with a first cylinder-piston unit 22 and a second cylinder-piston unit 23. Each of the cylinder-piston units 22, 23 comprises a piston 24, which is guided in a cylinder 25. The piston 24 is coupled to a connecting rod 26, which connects the piston 24 to a crankshaft 27. The crankshafts 27 are aligned parallel to one another and respectively carry spur gears 27*a* which have an external toothing. The externally toothed spur gears 27*a* engage into one another, so that the spur gears 27*a* rotate in opposite directions.

Each spur gear 27*a* is coupled to a generator 30 via a toothed belt 28. Two generators 30 are provided in total. In addition, the generators 30 comprise balance weights 30*a* which bring about a balance of the inertial forces and the moments of inertia.

The power unit further comprises a cam belt 31, which connects one of the crankshafts 27 with camshafts 32. A camshaft 32 is associated respectively with each cylinder-piston unit 22, 23. The camshafts 32 act respectively on valves 33, wherein each cylinder-piston unit preferably has respectively four valves 33.

Finally, an oil sump 34 is provided, in which an oil pump 35 is arranged. The oil pump 35 is driven via an oil pump belt 36, which connects the oil pump 35 to one of the crankshafts 27. Preferably, the oil pump 35 is connected to another crankshaft 27 than the camshafts 32. Furthermore, an oil filter 37 is arranged at the oil sump 34.

As can be readily seen in FIG. 6, the power unit 20 is constructed in a particular compact manner. It manages with relatively few parts and in this respect is maintenance-friendly and has a low weight. The two-cylinder reciprocating-piston engine is particularly low in noise and vibrations. In addition, the two-cylinder reciprocating-piston engine can be enclosed in a housing, wherein the housing can in addition contribute to the low noise and low vibrations. Preferably, the two-cylinder reciprocating-piston engine is configured such that in flight operation it is not detectable for the passengers whether the power unit 20 is activated or deactivated.

In FIG. 6 it can be seen in addition that the cylinders 25 of the cylinder-piston units 21, 22 are arranged interconnected to one another. In particular, the centre axes of the cylinders 25 have a smaller distance from one another than the centre axes of the crankshafts 27. Thereby, the connecting rods 26 stand inclined slightly obliquely with respect to one another at the top dead centre of the pistons 24, as is shown in FIG. 6. Thereby, the vibrations are massively reduced on start-up of the engine. In particular at the start of the power unit 20, start-up mass moments of inertia are reduced in this way, so that the otherwise known start-up vibrations do not occur.

In cruising flight, the power unit 20 is preferably operated and provides the electrical energy via the generators 30 which is necessary for the flight operation, in order to utilize the electric motors. Preferably a 48 Volt-, 400 Volt- or 800 Volt-system is integrated here as electrical system. The drive batteries are preferably mounted in the aircraft so that the centre of gravity of the aircraft is balanced well. In the aerofoils 11, fuel tanks for the fuel can be provided, which is necessary for the operation of the power unit 20. Preferably, the power unit 20 is operated by methanol.

The utilization of fossil fuels should, however, take place only in cruising flight. This is ensured through a corresponding control. In particular, the drive batteries are dimensioned so that a purely electric start and a purely electric landing is possible. In these flight phases, the power unit is therefore switched off. The power unit, on the other hand, is preferably activated when the battery state of charge falls below a predetermined threshold value and/or a minimum flight altitude is reached. It is particularly advantageous if the power unit 20 is activated so that in cruising flight the capacity in the electric drive batteries it kept at approximately 80%. In this way, the drive batteries are conserved and, at the same time, it is ensured that electrical energy is sufficiently available for a purely electric landing.

Figure 7:
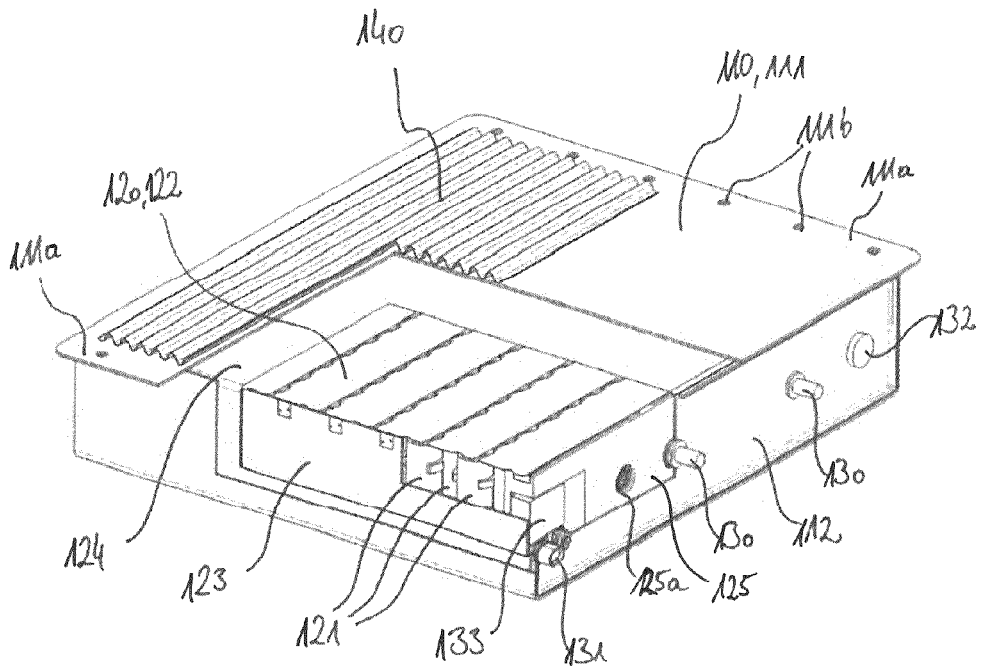

FIG. 7 shows a drive battery of an aircraft in accordance with the invention according to a preferred example embodiment. The drive battery comprises a, preferably a single, cell block 120, which is formed from several battery cells 121. The battery cells 121 are preferably arranged lying adjacent to one another with small packing density in staggered rows. In particular, lithium-ion round cells, preferably of the type 18650/2170, are used as battery cells 121. The cell block 120 can have an electrical voltage of 48 Volt or 60 Volt. The electrical energy density is preferably between 2.1 kWh and 3.3 kWh. The battery system preferably has a base area of 200×200 mm.

The battery cells 121 are connected electrically and mechanically by contact plates 122. The contact plates 122 extend over the battery poles and are welded to these, preferably by means of laser welding. A contact plate 122 respectively connects two rows of battery cells 121.

An electronics board 123 is arranged laterally along the cell block 120. The electronics board 123 comprises a battery monitoring system and several clamping contacts which are electrically connected to the contact plates 122. The clamping contacts are arranged so that each row of battery cells 121 can be monitored individually.

The cell block 120 is encased by an insulating encasement 124. The insulating encasement 124 is formed from an electrically insulating and heat-conducting material. In particular, the insulating encasement 124 is formed by a flexible foil which can lie closely against the cell block 120. The insulating encasement 124 encases the cell block 120 and connection modules 125, which are arranged at the end faces of the cell block 120. The connection modules 125 carry the essential electrical and, if applicable, pneumatic or respectively hydraulic connections for the connecting of the battery system with external components.

In an end-face connection module of the cell block 120, access openings 125a are arranged for the connection of a vacuum pump 133. The access openings 125a open out within the insulating encasement. The vacuum pump 133 is preferably electrically connectable to the cell block 120 and in particular operable with the nominal voltage (48V or 400V or 800V) of the cell block 120. The vacuum pump 133 connected to the electronics board 123, in particular the battery monitoring- or respectively management system (BMS).

The housing 110 of the battery system is formed from an aluminium sheet with a wall thickness of preferably 1 mm. The housing 110 has two housing end walls 112, which cover the connection modules. The side faces of the housing 110 are formed by housing side walls 111 which are welded to the housing end walls 112 in a gas-tight manner. The housing side walls 111 encase the cell block 120. Preferably, the housing side walls 111 lie directly against the insulating encasement 124 of the cell block 120.

As can be seen in FIG. 7, an upper housing side wall 111 has two projections 111a with fastening bores 111b. Thereby, the battery system is able to be easily mounted in the aircraft.

The housing side wall 111, in particular the upper and/or the lower housing side wall 111, can be equipped with a cooling element 140. The cooling element 140 can be formed by an aluminium corrugated sheet structure. The cooling element 140 is preferably fastened in a readily heat-conducting manner on the housing side wall 111.

The housing 110 has at least one connection 130 which extends into the housing 110 and is connectable or respectively connected to the underpressure pump 133 or respectively vacuum pump. The connection 130 is arranged in particular in the housing end wall 112. A vacuum can be set within the housing 110 through the connection with the vacuum pump. The vacuum causes the flexible insulating encasement 124 to deform and to lie closely against the cell block 120. In the example embodiment which is illustrated here, three connections 130 are provided in the housing end wall 112.

In general, provision can be made that at least one connection 130 comprises a non-return valve, so that after switching off the vacuum pump, the vacuum is retained within the housing 110. For safety aspects, it is additionally expedient if the housing 110 is furthermore equipped with a pressure relief valve 132. Such a pressure relief valve 132 opens outwards when a predetermined pressure is exceeded within the housing 10.

The housing side wall 111, in particular the upper and/or the lower housing side wall 111, has through the material selection (aluminium) and the small wall thickness (1 mm) a certain flexibility and is also deformed by the vacuum. Thereby the housing side wall 111 lies closely against the insulating encasement 124 closely encasing the cell block 120. The housing 110 is thus tensioned with the cell block 120.

The housing end wall 112 furthermore carries an electrical connection 131 for the electrical connecting of the battery system to external components. The electrical connection 131 can comprise a data line, in particular for connection to a master/slave bus system. The electrical connection 131 is preferably arranged in an off-centre and vertically offset manner, in order to form the correct electrical connection to external components in a manner safe for mounting. Preferably, the battery system comprises two differently poled electrical connections 131, which are arranged in opposite housing end walls 112. For example, the plus pole connection can be arranged on a front housing end wall 112, and the minus pole connection can be arranged on a rear housing end wall 112. A high protective distance is thus created between the electrical connections 131, which is expedient owing to the high current intensities. Furthermore, the reverse polarity protection is increased in this way.

The vacuum pump can be connected at least indirectly to the electrical connection 131, which pump is provided for maintaining the vacuum within the housing 110. The vacuum pump is thus supplied with the necessary operating voltage by the battery system itself, so that the overall system is self-sufficient.

Furthermore, provision is made that the vacuum pump is activated in a self-regulating manner. For this, the battery system has a pressure sensor which is arranged within the housing 110. By means of the pressure sensor, which is connected to a corresponding control unit, the vacuum is continuously monitored within the housing 110. As soon as the vacuum leaves a predetermined nominal value range or respectively falls below a predetermined nominal value, the control unit sends a control signal to the vacuum pump, so that the vacuum pump is activated. When the vacuum then reaches the predetermined nominal value again, the control unit sends a further control signal for stopping the vacuum pump.

By means of the pressure sensor, furthermore, a safety monitoring can be implemented. When, for example, the control unit detects that the vacuum can not be maintained for a sufficiently long time, or respectively the vacuum leaves the predetermined nominal value range too often or too quickly, a leakage of the housing 110 is to be assumed. The control unit then sends a control command which initiates for example the emitting of an alarm signal and/or the switching off of the battery system. Furthermore, the control signal can activate a second battery system, which can be provided as a backup module in a vehicle, in particular in an aircraft. The second battery system is preferably integrated into the master/slave bus system.

The control unit can emit corresponding control signals, in particular with regard to safety-relevant events, also on the basis of data of the battery monitoring system. Thus, for example, the indication of an alarm signal and/or the switching off of the battery system can be initiated, if on the basis of the data of the battery monitoring system it is detected that individual battery cells 121 can be charged insufficiently and therefore a cell defect is to be assumed.

LIST OF REFERENCE NUMBERS 10 passenger compartment
11 aerofoil
11a front aerofoil
11b rear aerofoil
11c upper aerofoil
11d lower aerofoil
12 cockpit
13 main rotor
13a rotor boom
14 rotor blade
15 drive propeller
15a nacelles
17 vertical stabilizer
17a rudder
18 landing gear
18a nose wheel
18b rear wheel
20 power unit
21 two-cylinder reciprocating-piston engine
22 first cylinder-piston unit
23 second cylinder-piston unit
24 piston
25 cylinder
26 connecting rod
27 crankshaft
27a spur gear
28 toothed belt
30 generator
30a balance weight
31 cam belt
32 camshaft
33 valve
34 oil sump
35 oil pump
36 oil pump belt
37 oil filter
110 housing 111 housing side wall
111a projection
111b fastening bore
112 housing end wall
120 cell block
121 battery cell
122 contact plate
123 electronics board
124 insulating encasement
125 connection module
125a access opening
130 connection
131 electrical connection
132 pressure relief valve
133 vacuum pump
140 cooling element
S centre of gravity

The invention claimed is:

1. An aircraft having a drive system comprising:
a power unit having a plurality of generators and a two-cylinder reciprocating-piston engine with two cylinder-piston units in tandem arrangement, wherein at least one generator is configured to generate electrical energy, each cylinder-piston unit having a crankshaft, wherein the crankshaft of each cylinder-piston unit is mechanically coupled to each other crankshaft, and wherein at least one crankshaft is mechanically connected to the at the least one generator, wherein the crankshafts are aligned parallel to one another and rotate in opposite directions, wherein the two-cylinder reciprocating-piston engine has a control configured to continue to operate one of the cylinder piston units in an event of a failure of the other cylinder-piston unit;
a plurality of drive batteries, wherein a first generator of the plurality of generators is electrically connected to a first drive battery, and a second generator of the plurality of generators is electrically connected to a second drive battery;
an electric motor drawing electrical energy from one or more of the drive batteries, wherein the electric motor is configured to operate purely in a battery-electric mode during a takeoff phase and a landing phase of the aircraft; and
at least one drive propeller driven by the electric motor to provide propulsion of the aircraft.

2. The aircraft according to claim 1, wherein the drive system comprises a serial hybrid drive system.

3. The aircraft according to claim 1, wherein the drive system has at least one fuel tank having methanol.

4. The aircraft according to claim 1 further comprising:
a housing sealed in a gas-tight manner; and
a cell block formed from several battery cells electrically and mechanically connected by contact plates, wherein the housing is connectable to a vacuum pump that generates a vacuum within the housing, and wherein at least one housing side wall of the housing is sufficiently flexible such that the at least one housing side wall is tensioned with the cell block by the vacuum acting within the housing.

5. The aircraft according to claim 4 further comprising a pressure sensor within the housing and arranged for controlling the vacuum pump, wherein the pressure sensor is connected to a control unit adapted to emit a control signal when a measured value of the pressure sensor lies outside a predetermined safety range.

6. The aircraft according to claim 1 further comprising:

at least one main rotor, wherein the drive system comprises a further electric motor which drives the at least one main rotor and draws electrical energy from the one or more drive batteries.

7. The aircraft according to claim 1 further comprising:

a landing gear having at least one electrically driven wheel selected from a nose wheel or a rear wheel.

8. The aircraft according to claim 7, wherein the at least one electrically driven wheel has an electric steering drive for changing a direction of travel of the aircraft.

9. The aircraft according to claim 7, wherein the landing gear has two wheels configured, dimensioned and arranged in spaced apart translation from one another and further spaced apart coaxially with respect to one another, wherein each of the two wheels is driven by a respective electric motor connected to a further control configured so that a change in direction of the aircraft is brought about by different actuation of the electric motors driving the two wheels.

10. An aircraft according to claim 1 wherein the at least one electrically driven drive propeller is enclosed in a sound insulation ring.

11. An aircraft having a drive system comprising:

a power unit having a plurality of generators and a two-cylinder reciprocating-piston engine with two cylinder-piston units in tandem arrangement, wherein at least one of the generators is configured to generate electrical energy, each cylinder-piston unit having a crankshaft, wherein the crankshaft of each cylinder-piston unit is mechanically coupled to each other crankshaft, and wherein at least one crankshaft is mechanically connected to the at the least one generator, the two-cylinder reciprocating-piston engine having a control configured to continue to operate one of the cylinder-piston units in the event of a failure of the other cylinder-piston unit;

a plurality of drive batteries, wherein a first generator of the plurality of generators is electrically connected to a first drive battery, and a second generator of the plurality of generators is electrically connected to a second drive battery; and an electric motor drawing electrical energy from one or more of the drive batteries.

12. The aircraft according to claim 11 further comprising:
a housing sealed in a gas-tight manner; and
a cell block formed from several battery cells electrically and mechanically connected by contact plates, wherein the housing is connectable to a vacuum pump that generates a vacuum within the housing, and wherein at least one housing side wall of the housing is sufficiently flexible such that the at least one housing side wall is tensioned with the cell block by the vacuum acting within the housing.

13. The aircraft according to claim 12 further comprising a pressure sensor within the housing and arranged for controlling the vacuum pump, wherein the pressure sensor is connected to a control unit adapted to emit a control signal when a measured value of the pressure sensor lies outside a predetermined safety range.

14. The aircraft according to claim 11 further comprising:
a landing gear having at least one electrically driven wheel selected from a nose wheel or a rear wheel, wherein the at least one electrically driven wheel has an electric steering drive for changing a direction of travel of the aircraft.

15. A method for operating an aircraft power unit of a drive system of an aircraft comprising:

drawing electrical energy from at least one drive battery to power an electric motor that drives a drive propeller of the aircraft to provide propulsion of the aircraft, wherein the electric motor is configured to operate purely in a battery-electric mode during a takeoff phase and a landing phase of the aircraft, wherein the drive battery is supplied from at least one electric generator driven by a two-cylinder reciprocating-piston engine of the aircraft power unit;

burning methanol as a fuel for operating the two-cylinder reciprocating-piston engine; and in response to a failure of one cylinder of the two-cylinder reciprocating-piston engine, continuing operation of a remaining cylinder of the reciprocating-piston engine.

16. The method of claim 15 further comprising:
tensioning a flexible side wall of a housing of the drive battery to bulge inwards using a vacuum pump within the housing so that a firm contact exists between the flexible side wall and a cell block of the drive battery.

17. The method of claim 16 further comprising:
emitting a control signal to the vacuum pump when a measured value from a pressure sensor measuring the vacuum within the housing lies outside a predetermined safety range.

* * * * *